Aug. 5, 1958 J. E. GUTRIDGE ET AL 2,846,172
FIFTH-WHEEL STAND FOR FREIGHT VEHICLES
Filed July 29, 1954 6 Sheets-Sheet 3
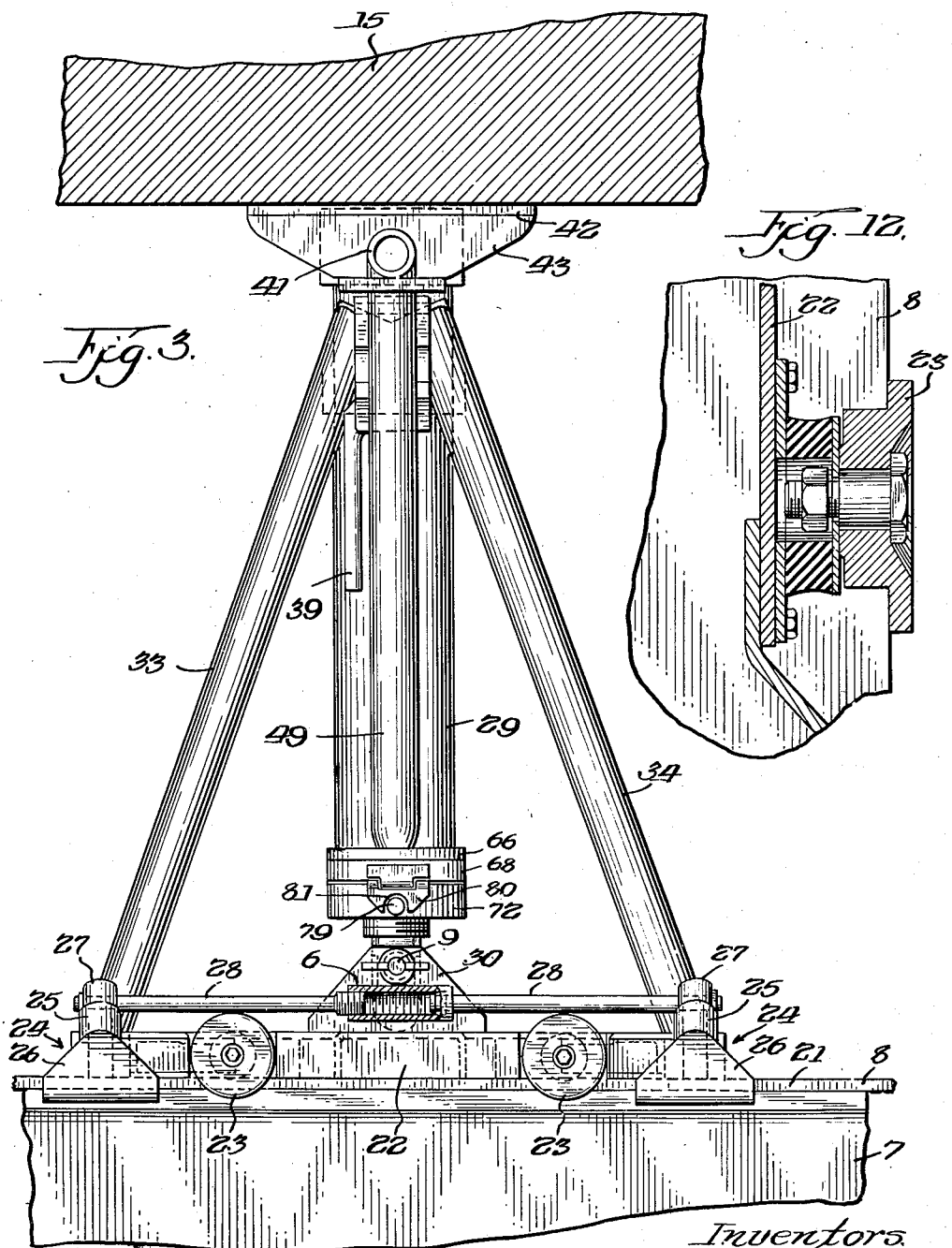
Inventors
Jack E. Gutridge, &
William E. Gribnitz, Jr.
By Wayne Morris Russell
Atty.

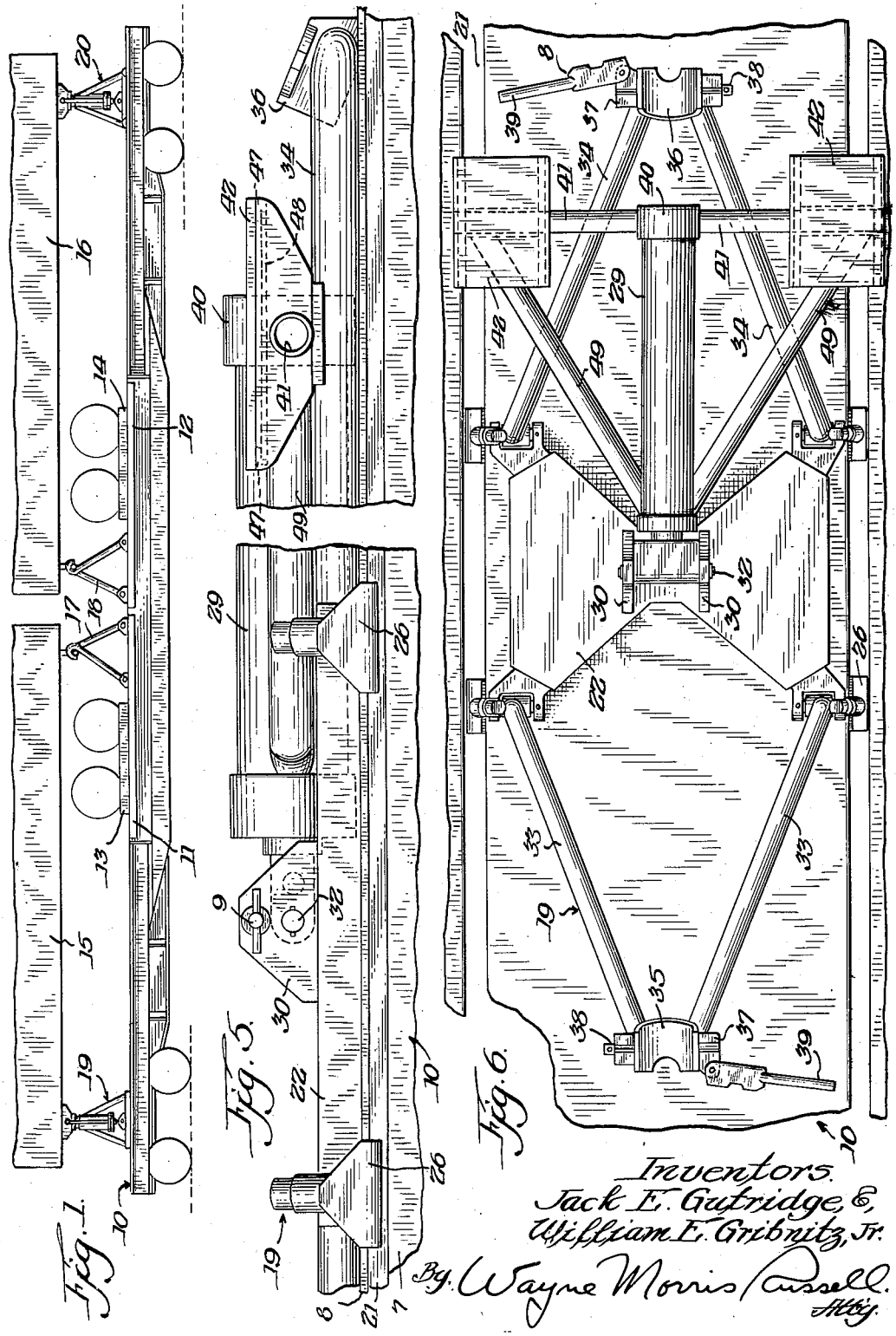

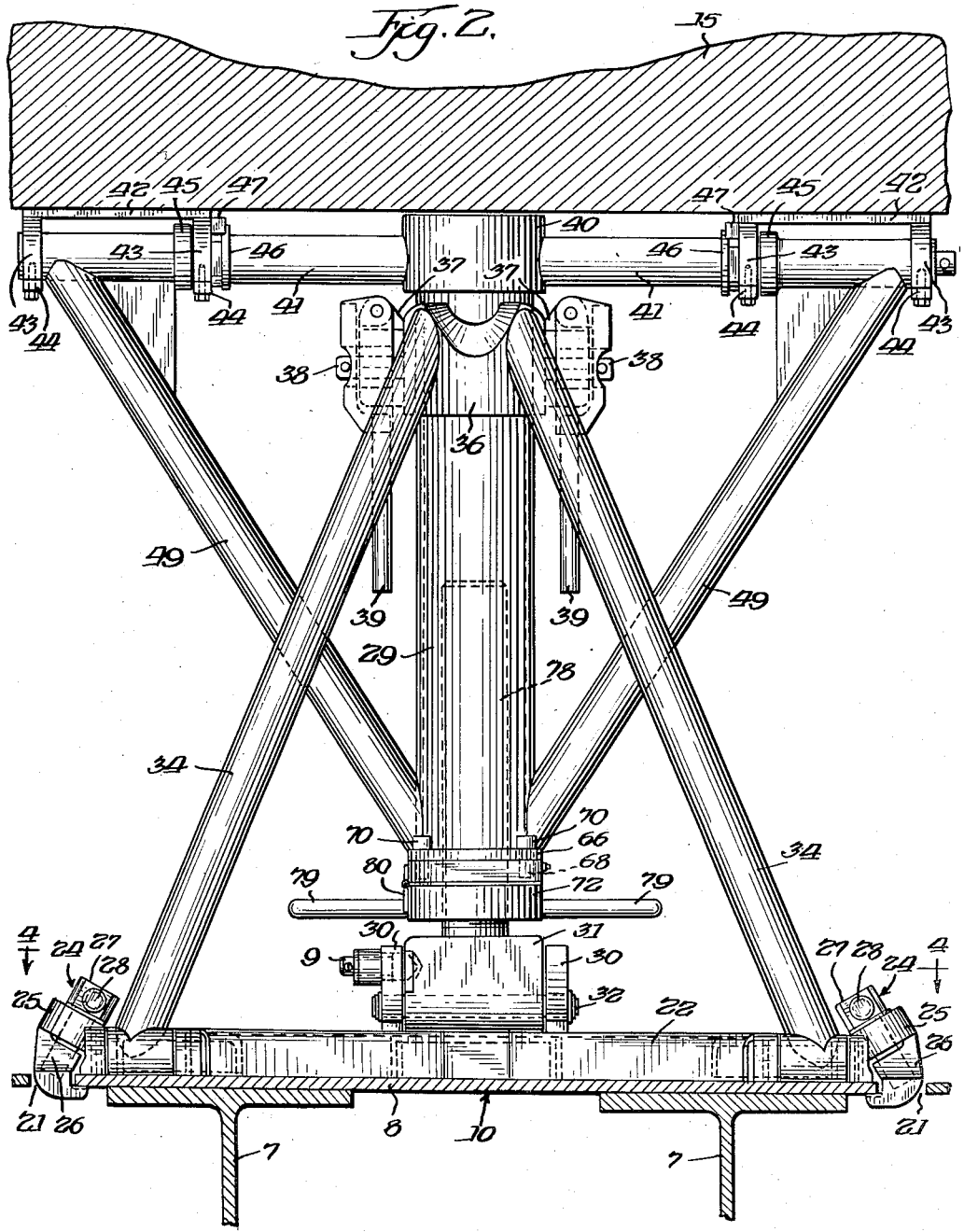

Aug. 5, 1958  J. E. GUTRIDGE ET AL  2,846,172
FIFTH-WHEEL STAND FOR FREIGHT VEHICLES
Filed July 29, 1954  6 Sheets-Sheet 4
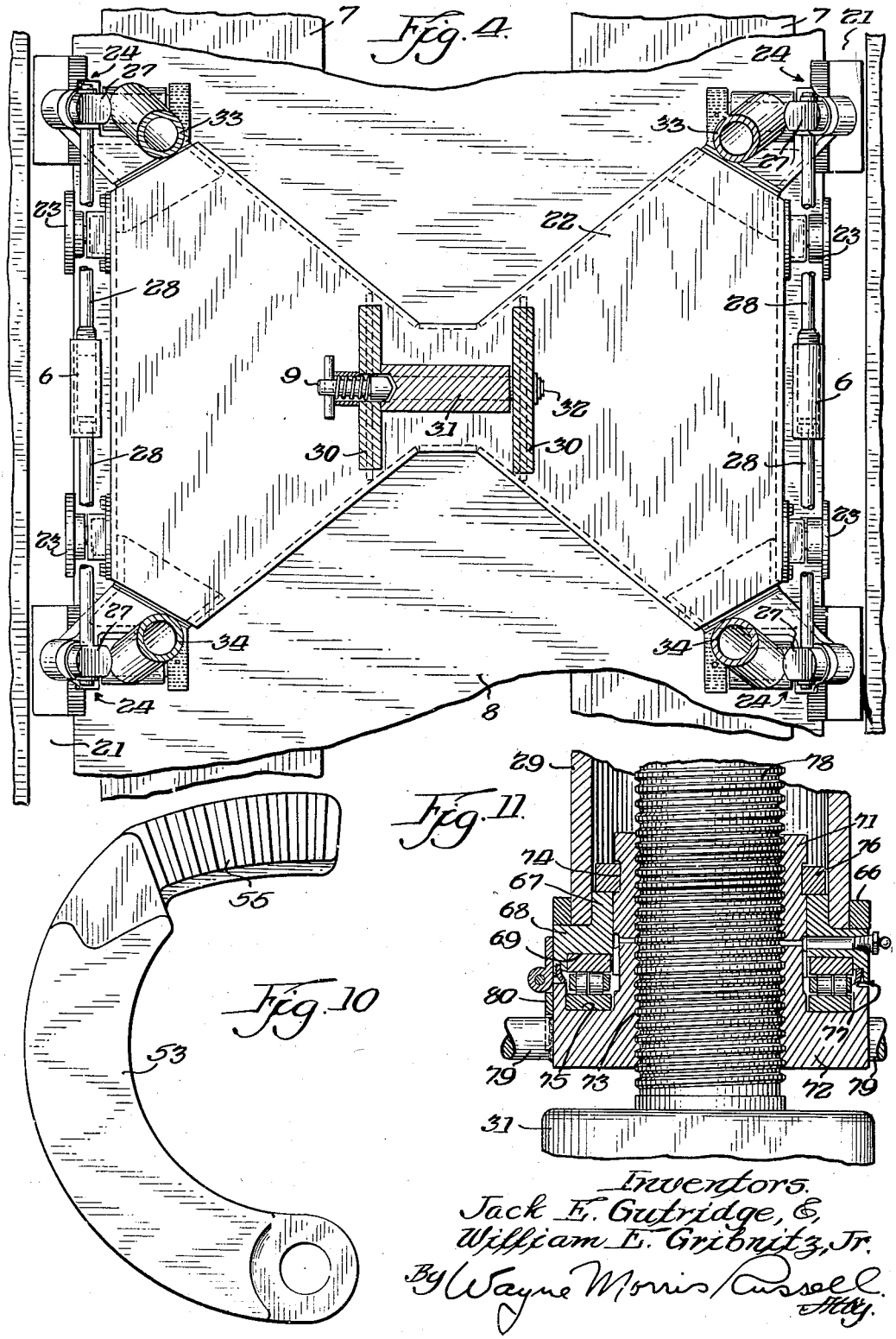
Inventors.
Jack E. Gutridge, &
William E. Gribnitz, Jr.
By Wayne Morris Russell
Atty.

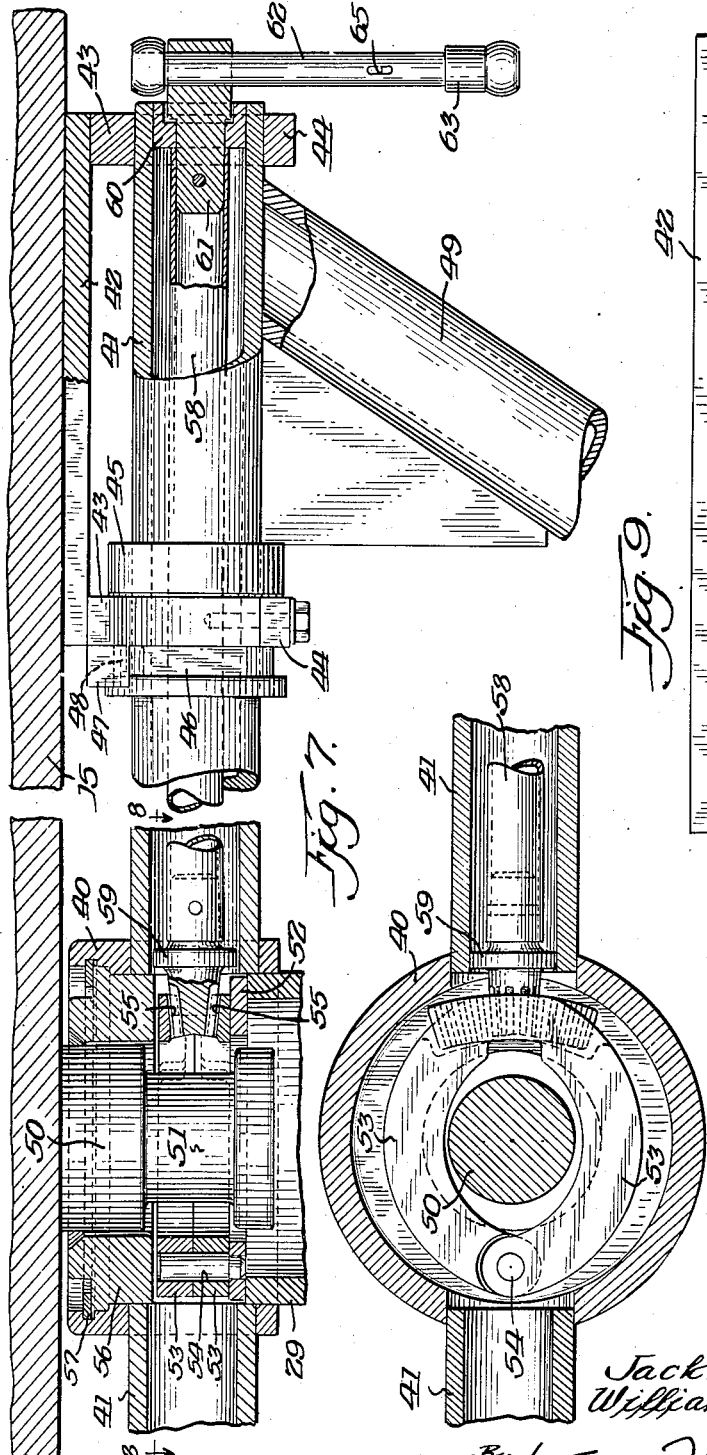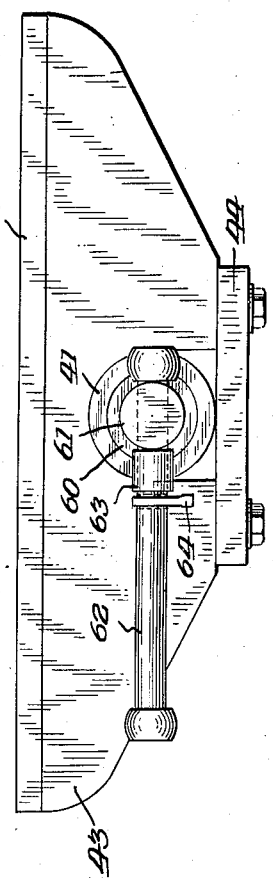

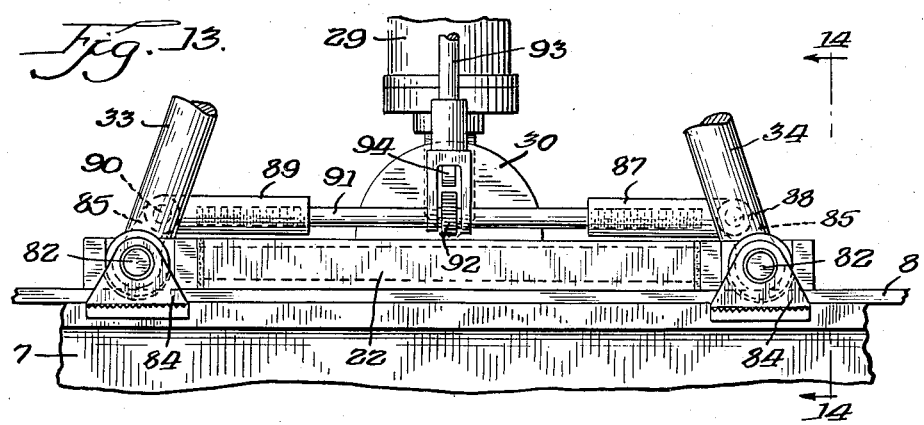

United States Patent Office 2,846,172
Patented Aug. 5, 1958

2,846,172

FIFTH-WHEEL STAND FOR FREIGHT VEHICLES

Jack E. Gutridge, Munster, Ind., and William E. Gribnitz, Jr., Chicago, Ill., assignors to Pullman-Standard Car Manufacturing Company, Chicago, Ill., a corporation of Delaware Application July 29, 1954, Serial No. 446,631

8 Claims. (Cl. 248—185)

This invention relates to the transportation of truck trailers on freight vehicles and is primarily concerned with a fifth wheel stand for supporting the front end of a trailer.

The principal object of the invention is to provide a fifth wheel stand which will permit a truck trailer to be loaded on freight vehicles from either the end or side thereof.

Another object of the invention is to provide a fifth wheel stand which may be moved to any position on the car to permit a pair of trailers to be carried back to back or front to back or front to front on the car.

Another object of the invention is to provide a novel means of clamping a fifth wheel stand to the floor of a freight vehicle.

A further object of the invention is to provide a fifth wheel stand having members which extend transversely of a trailer a substantial portion of its width to prevent torsional movement of the trailer about its longitudinal axis and to distribute the stresses acting on the stand into the trailer frame.

A further object of the invention is to provide a novel mechanism for holding the fifth wheel pin of a trailer in the fifth wheel stand.

A still further object of the invention is to provide a novel mechanism for making the fifth wheel stand vertically adjustable and to provide means for locking it once it is adjusted so that there can be no vertical movement of the stand during transportation of the trailer on the freight vehicle.

The foregoing and other objects of the invention are attained by the construction and arrangement illustrated in the accompanying drawings, wherein:

Fig. 1 is a side elevational view of a railway flat car showing two truck trailers loaded on the car;

Fig. 2 is a front elevational view of the fifth wheel stand for supporting the front end of a truck trailer with a portion of the truck trailer and a portion of the car being shown in section and showing the clamping means on the stand clamped to the floor of the car;

Fig. 3 is a side elevational view of the fifth wheel stand with a portion of the truck trailer being shown in section and showing a portion of the car at one of the slots in the car floor and the clamping means on the stand clamped to the floor of the car;

Fig. 4 is a horizontal cross-sectional view taken on the line 4—4 of Fig. 2;

Fig. 5 is a side elevational view of the fifth wheel stand in collapsed position on the floor of the car;

Fig. 6 is a plan view of the fifth wheel stand in collapsed position on the floor of the car with certain parts omitted for clearness;

Fig. 7 is a view partly in section and partly in elevation of the upper portion of the fifth wheel stand and through a portion of one of the truck trailers showing the mechanism in the stand for holding the fifth wheel pin of the trailer in the stand during transportation of the trailer on the car;

Fig. 8 is a horizontal cross sectional view taken on the line 8—8 of Fig. 7;

Fig. 9 is a side elevational view at the upper portion of the fifth wheel stand showing one of the plates for supporting a truck trailer and the handle for operating the mechanism of Fig. 7 with the handle being shown in locked position;

Fig. 10 is a detail view of one of the jaws in the mechanism of Fig. 7;

Fig. 11 is a vertical sectional view through a portion of the fifth wheel stand showing the mechanism for making the stand vertically adjustable;

Fig. 12 is a horizontal sectional view through one of the wheels and its mounting on the fifth wheel stand;

Fig. 13 is a side elevational view of the lower portion of the fifth wheel stand and showing a portion of the car at one of the slots in the car floor with a modified form of clamping means on the stand and the clamping means being shown clamped to the floor of the car;

Fig. 14 is a view taken on the line 14—14 of Fig. 13 with the operating handle for the clamping means omitted;

Fig. 15 is a vertical sectional view through the upper portion of the fifth wheel stand showing a modified form of mechanism for holding the fifth wheel pin of a trailer in the stand during transportation of the trailer on the car; and Fig. 16 is a horizontal cross-sectional view taken on the line 16—16 of Fig. 15.

The invention proposes a fifth wheel stand for supporting a truck trailer on a freight vehicle. The floor of the car is provided with a pair of longitudinally extending spaced slots. The fifth wheel stand has clamps on its base which project into the slots in the floor of the car and engage the underface of the floor and it has wheels on its base which roll on the floor. Thus the stand may be moved longitudinally of the car. A standard has one end pivotally connected to the center of the base and a pair of converging arms have their diverging ends pivotally connected to one end of the base and another pair of similarly disposed arms are connected to the other end of the base in a similar manner. A sleeve section is secured to the other ends of each pair of arms and the sections together are adapted to encircle the standard. The sections are connected together by releasable means thus holding the standard in a vertical position. A pair of aligned members extend from the other end of the standard and plates are pivotally mounted on the outer ends of these members. The plates and the upper end of the standard together support the front end of a trailer. One pair of arms are pivoted outwardly away from the base onto the floor of the car and the other pair of arms are pivoted outwardly away from the base onto the floor and the standard with its members and plates is pivoted over onto either pair of arms to completely collapse the stand onto the floor of the car.

In the drawings, 10 generally designates a freight vehicle, specifically a railway flat car having a center sill consisting of spaced I-beams 7 and a floor 8 on the center sill and having a pair of elevators 11 on opposite sides of the center sill and another pair of elevators 12 on opposite sides of the center sill. A turntable 13 is pivotally mounted on one of the elevators 11 and another turntable 14 is pivotally mounted on one of the elevators 12. The rear wheels at one side of a truck trailer 15 to be carried on the car are disposed in the turntable 13 and the rear wheels at one side of another truck trailer 16 to be carried on the car are disposed in the turntable 14. The trailer 15 is backed onto the car so that the rear wheels at one side of the trailer move onto the turntable 13. The front end of the trailer 15 is then swung onto the car with the rear wheels on the turntable 13 pivoting with the turntable while the rear wheels at the other side of the trailer roll on the floor 8 of the car. The procedure for loading the trailer 16 is similar. After the trailers 15 and 16 are loaded on the car, the elevators 11 and 12 may be lowered below the level of the floor of the car so that the tops of the trailers will clear tunnels, bridges and other structures along the railroad during their transportation. However, the trailers 15 and 16 may not have great height and the elevators 11 and 12 may remain flush with the floor of the car during their transportation. To prevent vertical movement of the rear ends of the trailers 15 and 16, hold-down devices 17 and 18 may be provided. To support the front ends of the trailers 15 and 16, fifth wheel stands 19 and 20 are provided. Since the fifth wheel stands 19 and 20 are identical, only the fifth wheel stand 19 will be described.

The floor of the car is provided with a pair of longitudinally extending spaced slots 21 which extend the full length of the car. At the central portion of the car the elevators 11 and 12 form the outer walls of the slots 21. The fifth wheel stand 19 is comprised of a base 22 and a pair of flanged wheels 23 are positioned at each side of the base and are adapted to roll on the floor of the car with the flanges engaging in the slot. A metal plate is bolted to a depending side flange on the base 22 and a rubber block is cemented to the plate and another metal plate is cemented to the rubber block. A bolt extends through the last-named plate part of the way into the rubber block and the respective wheel 23 is rotatably mounted on the bolt. A pair of clamps 24 are mounted at each side of the base 22 and are adapted to project into the slots 21 and engage the underface of the floor. A pair of spaced lugs project from each corner of the base 22 and a pin is rotatably mounted in these lugs. Each clamp 24 consists of a foot 25 integral with the outer lug and provided with a hole therein and a dog 26 is disposed in the adjacent slot 21 in the floor of the car and the dog is provided with a threaded hole therein. A screw 27 extends loosely through the hole in the foot 25 and is in threaded engagement with the hole in the dog 26. The head of the screw 27 has a hole in it and a handle 28 extends loosely therethrough. Turning of the handle 28 in one direction causes the dog 26 to engage the underface of the floor as best shown in Fig. 2, and turning of the handle in the opposite direction causes the dog to move away from the underface of the floor. At each side of the base 22 there are two handles 28 and one of these handles has both ends flanged, while the other has one end threaded, as shown in Figs. 3 and 4. A tubular housing 6, disposed on the handle which has both ends flanged, has one end open and the other end closed and the closed end is provided with a hole having a diameter slightly greater than the diameter of the handle 28 but not as great as the diameter of the flange on the end of the handle. The housing 6 is threaded inwardly from its open end and is slidable on the one handle 28 so that it may be screwed on the threads on the other handle so that the screws 27 will not work loose and thus loosen the clamp during transportation of the trailer on the car. A cylindrical standard 29 is normally disposed in a vertical position during use, but when not in use it may be moved to a position substantially parallel with the floor. A pair of spaced vertical blocks 30 are fixedly secured to the center of the base 22 and a block 31 on the lower end of the standard is disposed between the blocks 30, and a pin 32 extends through the blocks 30 and 31 to pivotally connect the lower end of the standard to the center of the base. One of the blocks 30 has a hole through it and the block 31 is provided with a recess therein. A small housing is fixedly secured to the block 30 over the hole in the block. A detent pin 9 having an enlarged head on one end and a handle on the other extends through the housing and the block 30 into the recess in the block 31 and a coil spring surrounds the pin and bears against the head on the pin and against the housing to urge the pin into the recess in the block 31 to form a releaseable means on the base 22 adapted to hold the standard 29 in a vertical position. A pair of arms 33 are arranged in converging relation with respect to each other and have their diverging ends pivotally connected to one end of the base 22. A short horizontal tube is fixedly secured to the diverging end of each arm 33 and each tube is situated between the pair of lugs at the corner of the base 22 and the pin referred to above extends through the lugs and the tube to pivotally connect the diverging end of each arm to the base. Another pair of arms 34 are arranged in converging relation with respect to each other and having their diverging ends pivotally connected to the other end of the base 22 in a manner similar to the diverging ends of the arms 33. A semicircular sleeve section 35 is fixedly secured to the other ends of the pair of arms 33 and another semicircular section 36 is fixedly secured to the other ends of the pair of arms 34. The section 35 has an ear 37 fixedly secured to one edge and the ear has a V-shaped groove in its inner face at right angles to the standard 29. The adjacent edge of the section 36 has a block fixedly secured thereto and the block has a V-shaped rib on its inner face at right angles to the standard 29 and an apertured extension 38 is integral with the block. A handle 39 has a head on one end pivotally connected to the ear 37 and with a recess therein which is adapted to receive both the ear and the block. The head also has an aperture in it in communication with the recess, and the extension 38 projects through the aperture in the head when the handle is in a vertical position. A cotter key or pin may be placed in the aperture in the extension 38 to maintain the handle 39 in a vertical position. An ear 37 is fixedly secured to the opposite edge of the section 36 and a block and extension 38 is fixedly secured to the adjacent edge of the section 35 and a handle 39 is pivotally connected to the ear. The two sleeve sections 35 and 36 are adapted to engage and encircle the standard 29 when the latter is in a vertical position and the rib in each block seats in the groove in the respective ear 37 to prevent movement of the sections relative to each other, thus assuring that the standard will not be able to tilt but will be held in vertical position at all times. A collar 40 surrounds and is fixedly secured to the upper end of the standard 29 and has diametrically opposed holes therein. A horizontally disposed tubular member 41 has one end disposed and fixedly secured in one hole of the collar and another horizontally disposed tubular member 41 is arranged in aligned relation with the first-named member and has one end disposed in the other hole of the collar and is fixedly secured to the collar. A plate 42 is pivotally mounted on each member 41 adjacent the other end of the respective member and the plates 42 and the collar 40 support the front end of the trailer 15. Since the plates 42 are similar, only the one shown on the right hand side of Fig. 2 and in Fig. 7 will be described. A pair of supports 43 are fixedly secured to the plate 42 and these supports have cut outs which receive the member 41. A strap 44 is bolted to each support 43 and is situated below the member 41. Thus the supports 43 and straps 44 pivotally support the plate 42 on the member 41. A collar 45 is fixedly secured to the member 41 on one side of one of the supports 43 and a collar 46 is fixedly secured to the member on the other side of the support. The collar 46 has a reduced portion in the shape of a square with the corners rounded off, thus providing flat surfaces at right angles to each other and a larger circular portion. A retainer 47 is disposed at each end of the inner support 43 and is fixedly secured to the support and the plate 42 and a leaf spring 48 (Fig. 5) is disposed between the larger portion of the collar 46 and the support with the intermediate portion of the spring bearing upon the adjacent flat surface of the collar and the ends of the spring bearing against the retainers. The spring 48 bearing upon the adjacent flat surface of the collar 46 holds the plate 42 is a horizontal position when the stand is in position for use. During the collapsing of the stand, the plate 42 is rotated ninety degrees back into a horizontal position and the spring 48 moves onto the adjacent flat surface to hold the plate in horizontal position. A brace in the form of a tube 49 has one end fixedly secured to one of the members 41 and has its other end fixedly secured to the standard 29 at a location spaced above the lower end of the standard. Another brace 49 is similarly secured to the other member 41 and the standard 29. A gusset is fixedly secured to each member 41 and each brace 49. To collapse the stand 19, the pins in the extensions 38 are removed and the handles 39 swung upwardly to a horizontal position. The pair of arms 33 are then swung outwardly away from the base 22 until they rest upon the floor 8 and then the pair of arms 34 are swung outwardly away from the base until they rest upon the floor and then the standard 29 with the members 41 and the plates 42 is swung over onto either pair of arms to complete the collapsing of the stand.

Referring to Figs. 7, 8, 9, and 10, there is shown a holding mechanism which is mounted at the upper end of the standard 29. The trailer 15 has a conventional fifth wheel pin 50 fixedly secured to the bottom thereof adjacent to and spaced from the front end thereof. The fifth wheel pin 50 has a peripheral groove 51 therein. The mechanism to be described is a means for holding the fifth wheel pin 50 in the fifth wheel stand 19 during transportation of the trailer 15 on the car. A wear ring 52 is positioned in the collar 40 and is fixedly secured to the top of the standard 29 and has an aperture therein between its inside and outside diameters. A pair of jaws 53 are positioned one above the other and a pivot pin 54 extends through the contacting ends of the jaws and into the aperture in the wear ring 52, thus pivotally connecting the jaws to the standard 29. Each jaw 53 is cut away beginning at the other end thereof and continuing inwardly of the jaw a considerable distance until it is about one half as thick as the remainder of the jaw and the portion of lesser thickness is provided with gear teeth 55, as best shown in Fig. 10. A thick retaining ring 56 is seated on ledges within the collar 40 and a snap ring 57 projects into a groove in the collar to hold the retaining ring in the collar and over the jaws 53. A rod 58 is disposed in one of the members 41 and extends substantially the full length of the member and a gear element 59 is riveted to the inner end of the rod. The gear element 59 has teeth thereon which project between the toothed portions of the jaws 53 and are adapted to mesh with the teeth on the jaws. A circular bearing 60 is fixedly secured in the outer end of the member 41 and a stub shaft 61 extends through the bearing and is riveted to the rod 58 and the stub shaft has a hole therein extending transversely of the shaft. A handle 62 is loosely slidably mounted in the hole in the stub shaft 61 and the handle has a head on each end to prevent it from becoming separated from the stub shaft. Rotation of the rod 58 in a clockwise direction as viewed in Fig. 9 causes the jaws 53 to move toward each other into the groove 51 in the fifth wheel pin 50 and rotation of the rod in a counterclockwise direction as viewed in Fig. 9 causes the jaws to move away from each other. Means are provided to maintain the jaws 53 in locked position against the fifth wheel pin 50. When the jaws 53 are locked against the pin 50 the handle 62 will be in a horizontal position and the handle is then pulled until one head of the handle is in contact with the stub shaft 61 and then a slide 63 on the handle is moved until it is in contact with the stub shaft and is engaged in a notch in the end of the member 41 and the bearing 60. A seal 64 is then inserted through the aperture 65 in the handle 62 to prevent movement of the slide 63 and the handle.

Means are provided for making the standard 29 vertically adjustable so that the trailer 15 will be level during its transportation on the car. Referring to Fig. 11, a flange 66 is fixedly secured to the lower end of standard 29 and has four screw holes therein. A sleeve has two circular portions 67 and 68, the portion 68 being larger than the portion 67, and the sleeve is provided with a recess 69 in the circular portion 68, the smaller circular portion being disposed in the standard 29 and the larger circular portion bearing against the standard. Four screws 70 (Fig. 2) extend through the flange 66 and are in threaded engagement with holes in the sleeve. A nut element has two circular portions 71 and 72, the portion 72 being larger than the portion 71. The element is provided with a threaded opening 73 extending longitudinally therethrough and the smaller circular portion being provided with a peripheral groove 74 and the element is provided with a recess 75 in the upper surface of the larger circular portion 72, and the smaller circular portion is disposed in the sleeve. Retaining means in the form of two semicircular rings 76 are disposed in the peripheral groove 74 in the nut element and bear against the sleeve. The rings 76 prevent the nut element from being separated from the standard 29. Thrust bearings 77 are disposed in the recesses 69 and 75 in the sleeve and nut element respectively. A jack screw 78 is integral with the block 31 and is in threaded engagement with the opening 73 in the nut element. A pair of handles 79 are fixedly secured at diametrically opposite points to the larger circular portion 72 of the element. A plate is fixedly secured to the larger circular portion 68 of the sleeve and another plate 80 (Figs. 3 and 11) is hingedly mounted on the first named plate, and the plate 80 is provided with a notch 81. Rotation of the element in one direction by means of the handles 79 will cause the nut element to move upward on the screw 78 thus raising the standard 29, and rotation of the element in the opposite direction will cause the element to move downward on the screw thus lowering the standard. When the vertical positioning of the nut element is completed one of the handles 79 is brought directly under the plate 80 and the plate will fall by gravity so that the notch 81 will receive and lock the handle against rotation to prevent the nut element from turning relative to the standard 29 while the trailer 15 is being transported on the car.

In Figs. 13 and 14, there is shown a modified means of clamping the fifth wheel stand 19 to the floor of the car. A pair of spaced lugs are secured to each corner of the base 22 and a pin 82 is rotatably mounted in each pair of lugs. A wheel 83 is rotatably mounted on each pin 82 and each wheel is adapted to roll on the floor of the car and has a flange which projects into the adjacent slot 21 in the floor. A clamp 84 is fixedly secured on the outer end of each pin 82 and is positioned in the slot 21 in the floor. The portion of each pin 82 that is represented by the distance *e* (Fig. 14) is eccentric with respect to the remainder of the pin. The pairs of arms 33 and 34 are rotatably mounted on the pins 82. A link 85 is fixedly secured on each pin 82. A lock ring 86 is fixedly secured on the inner end of each pin 82. A part or thimble 87 has one end pivotally connected to the link 85 at one side of the base 22 by a pin 88 and has a right hand threaded recess extending inwardly from its other end. A thimble or part 89 has one end pivotally connected to the other link 85 at the same side of the base 22 by a pin 90, and has a left hand threaded recess extending inwardly from its other end. A rod 91 has right hand threads on one end threaded in the recess of the part or thimble 87 and has left hand threads on its other end threaded in the thimble 89. A ratchet 92 is fixedly secured on the center of the rod and a handle 93 is swingably mounted on the rod 91 by a yoke the two arms of which are disposed on opposite sides of the gear wheel. A pawl 94 is slidably mounted in the handle 93 and a coil spring is mounted in the handle which urges the pawl outwardly toward the ratchet 92. The pawl 94 is manually retractable into the handle 93. The pawl 94 is adapted to engage the ratchet 92 to turn the rod 91. Turning of the rod 91 in one direction causes the rod to move into the threaded recesses in the parts or thimble 87 and 89 to draw them toward each other, and this causes rotation of the pins 82, by reason of the pin eccentricity resulting in the clamps 84 moving into engagement with the underface of the floor of the car. Turning of the rod in the opposite direction causes the clamps to move out of engagement with the floor.

In Figs. 15 and 16, there is shown a modified means of holding the fifth wheel pin 50 in the fifth wheel stand 19 during transportation of the trailer 15 on the car. A collar 95 is fixedly secured on the upper end of the standard 29 and the collar is provided with diametrically opposed holes 96 and diametrically opposed apertures 97. A sleeve 98 is positioned in the collar 95 and is provided with diametrically opposed recesses 99 in its inner face and with a threaded hole 100 extending from the bottom of each recess to the outer face of the sleeve. An arcuate jaw 101 is positioned in each recess 99 in the sleeve 98 and a screw 102 extends through the respective aperture 97 in the collar 95 and is in threaded engagement with the respective hole 100 in the sleeve. Each screw 102 has its inner end of reduced diameter and this reduced end is rotatably mounted in the respective jaw 101 and a snap ring 103 is disposed on the reduced end to prevent the screw from becoming separated from the jaw. Each screw 102 has a suitable socket or other means on its outer end so that it can be turned by the use of a suitable tool, and turning of the respective screw in one direction causes the respective jaw 101 to move inwardly of the standard 29 into the groove 51 in the fifth wheel pin 50 and turning of the screw in the opposite direction causes the jaw to move outwardly of the standard and out of the groove in the fifth wheel pin. The members 41 extend through the holes 96 and 104 in the collar 95 and sleeve 98 respectively and are fixedly secured to the collar.

If the fifth wheel stands and hold-down devices are not collapsible, trailers can be loaded on the car from the sides of the car but not from the ends of the car. The trailers cannot be loaded on the car from the ends of the car because the trailer rear wheel axles or other structure would collide with the fifth wheel stands and hold-down devices. As stated, the fifth wheel stands 19 and 20 are collapsible on the floor of the car. The hold-down devices 17 and 18 are also collapsible on the floor of the car. This means that the trailers 15 and 16 can be loaded on the car from the ends of the car or from the sides of the car. Thus the trailers 15 and 16 can be loaded on the car from different types of railroad terminals.

The fifth wheel stands 19 and 20 are put on the car at the end of the car by placing the dogs 26 in the slots 21 in the floor of the car. The stands 19 and 20 can be moved full length of the car in the slots 21. The hold-down devices 17 and 18 are also slidable in the slots 21 and these devices can be moved the full length of the car. This means that the stands 19 and 20 and the hold-down devices 17 and 18 may be placed at any position on the floor of the car. Thus the trailers 15 and 16 can be placed back to back, or front to back, or front to front on the car.

The fifth wheel stand collapses into three major components which are the arms 33, the arms 34, and standard 29 and members 41 and plates 42 and braces 49. This means that the operator will only have to support the weight of one component at a time in lowering the component to the floor of the car in collapsing the fifth wheel stand.

The members 41 and plates 42 prevent torsional or twisting or tilting movement of a trailer about its longitudinal axis. The fifth wheel stand bears against three different places on the trailer, thus distributing the stresses in the trailer frame. That is, two plates 42 and the collar 40 bear against the bottom of the trailer. In the conventional fifth wheel stand, only the collar 40 bears against the bottom of the trailer and the stress on the trailer frame is at a single location.

An advantage of the locking mechanism shown in Fig. 7 is that the mechanism can be operated from the side of the trailer, and the operator does not have to crawl under the trailer to operate it. This means that the fifth wheel pin 50 can be put in the fifth wheel stand or removed from the stand in much less time, and with complete safety. Since the mover does not have to crawl under the trailer, his clothes will not be torn or soiled, and there will be no chance of his injury by the trailer falling upon him.

The fifth wheel stands 19 and 20 and the hold-down devices 17 and 18 may be slid along the slots 21 in the floor 8 to the end of the car and removed from the car. The car may then be used for carrying general freight.

From the foregoing, it will be seen that there has been provided a fifth wheel stand which will permit either end or side loading of trailers on a freight vehicle and is movable to any position on the car to permit a pair of trailers to be carried back to back or front to back or front to front and prevents torsional movement of the trailer about its longitudinal axis.

What is claimed is:

1. A fifth-wheel stand comprising a base, a standard having one end pivotally connected to the base, a first pair of arms arranged in converging relation with respect to each other and having their diverging ends pivotally connected to one side of the base, a second pair of arms arranged in converging relation with respect to each other and having their diverging ends pivotally connected to the other side of the base, a first section secured to the other ends of the first pair of arms, a second section secured to the other ends of the second pair of arms and the first and second sections being adapted to engage the standard when the latter is in a vertical position and releasable means on the first and second sections for securing them together, the first pair of arms being adapted to pivot outwardly away from the base to collapsed position and the second pair of arms being adapted to pivot outwardly away from the base to collapsed position and the standard being adapted to pivot over onto either the first pair of arms or the second pair of arms in the collapsed position.

2. A fifth-wheel stand for supporting a vehicle on a freight vehicle comprising a base, a standard having one end pivotally connected to the base, a first pair of arms arranged in converging relation with respect to each other and having their diverging ends pivotally connected to one side of the base, a second pair of arms arranged in converging relation with respect to each other and having their diverging ends pivotally connected to the other sides of the base, a first section secured to the other ends of the first pair of arms, a second section secured to the other ends of the second pair of arms and the first and second sections being adapted to engage the standard when the latter is in a vertical position, releasable means on the first and second sections for securing them together, a first horizontally disposed member having one end secured to the other end of the standard, a second horizontally disposed member arranged in aligned relation with the first member and having one end secured to the other end of the standard and the first and second members being adapted to support the vehicle, the first pair of arms being adapted to pivot outwardly away from the base to collapsed position and the second pair of arms being adapted to pivot outwardly away from the base to collapsed position and the standard and the first and second members being adapted to pivot over onto either the first pair of arms or the second pair of arms in the collapsed position.

3. A fifth-wheel stand for supporting a vehicle on a freight vehicle comprising a base, a standard having one end pivotally connected to the base, a first pair of arms arranged in converging relation with respect to each other and having their diverging ends pivotally connected to one side of the base, a second pair of arms arranged in converging relation with respect to each other and having their diverging ends pivotally connected to the other side of the base, a first section secured to the other ends of the first pair of arms, a second section secured to the other ends of the second pair of arms and the first and second sections being adapted to engage the standard when the latter is in a vertical position, releasable means on the first and second sections for securing them together, a first horizontally disposed member having one end secured to the other end of the standard, a second horizontally disposed member arranged in aligned relation with the first member and having one end secured to the other end of the standard, a plate pivotally mounted on the first member adjacent the other end thereof, a plate pivotally mounted on the second member adjacent the other end thereof and the plates being adapted to support the vehicle, the first pair of arms being adapted to pivot outwardly away from the base to collapsed position and the second pair of arms being adapted to pivot outwardly away from the base to collapsed position and the standard and the first and second members and the plates being adapted to pivot over onto either the first pair of arms or the second pair of arms in the collapsed position.

4. A fifth-wheel stand comprising a standard, a first horizontally disposed member having one end secured to the standard, a second horizontally disposed member arranged in aligned relation with the first member and having one end secured to the standard, a plate pivotally mounted on each member adjacent its other end, a collar fixedly secured on each member adjacent its respective plate and the collar having two surfaces at right angles to each other, and a leaf spring at each plate and the ends of the spring engaging the respective plate and the intermediate portion of the spring bearing against one of the surfaces on the respective collar to hold the plate in a horizontal position when the standard is in a vertical position and the standard being collapsible to a horizontal position and the plate being adapted to pivot about its respective member with the spring engaging the other surface on the collar to hold the plate in a horizontal position when the standard is in the collapsed position.

5. A fifth-wheel stand for supporting the front end of a truck trailer having a fifth-wheel pin provided with a peripheral groove comprising a standard provided with an opening in one end and a hole in the wall of the standard adjacent said one end, a pair of jaws positioned in the opening in the standard and having their adjacent ends pivotally connected to the standard and having teeth on their other ends, a gear element disposed in the hole in the standard and projecting between the other ends of the jaws and adapted to mesh with the teeth on the jaws, and a handle rotatably supported in the stand and connected to the gear element, rotation of the handle in one direction causing the jaws to move toward each other into the groove in the fifth wheel pin and rotation of the handle in the opposite direction causing the jaws to move away from each other.

6. A fifth-wheel stand for supporting the front end of a truck trailer having a fifth-wheel pin provided with a peripheral groove comprising a standard provided with an opening in one end and a hole in the wall of the standard adjacent said one end, a horizontally disposed hollow member having one end positioned over the hole in the standard and secured to the standard, a pair of jaws positioned in the opening in the standard and having their adjacent ends pivotally connected to the standard and having teeth on their other ends, a rod disposed in the member, a gear on one end of the rod projecting between the other ends of the jaws and adapted to mesh with the teeth on the jaws, and a handle on the other end of the rod, rotation of the rod in one direction causing the jaws to move toward each other into the groove in the fifth wheel pin and rotation of the rod in the opposite direction causing the jaws to move away from each other.

7. A fifth-wheel stand comprising a hollow member, a flange secured on one end of the member, a sleeve having two circular portions and one of the portions being larger than the other and the sleeve being provided with a recess in the larger circular portion and the smaller circular portion being disposed in the member and the larger circular portion bearing against said one end of the member, means securing the sleeve to the flange, a nut element having two circular portions and one being larger than the other and the element being provided with a threaded opening extending longitudinally therethrough and the smaller circular portion being provided with a peripheral groove and the element being provided with a recess in the larger circular portion and the smaller circular portion being disposed in the sleeve, a retaining ring in the peripheral groove in the element and bearing against the sleeve, bearings disposed in the recesses in the sleeve and the nut element, a jack screw in threaded engagement with the opening in the element, a handle secured to the element, a plate provided with a notch and hingedly mounted on the sleeve and the plate falling by gravity so that the notch will receive the handle to prevent the element from turning relative to the member.

8. A fifth-wheel stand for supporting the front end of a truck trailer having a fifth-wheel pin provided with a peripheral groove comprising a standard provided with an opening in one end and opposed apertures in its wall adjacent said one end, a sleeve positioned in the opening in the standard and provided with diametrically opposed recesses in its inner face and provided with a threaded hole extending from the bottom of each recess to the outer face thereof, a jaw positioned in each recess in the sleeve, a screw extending through the respective aperture in the standard and in threaded engagement with the respective hole in the sleeve and rotatably mounted in the respective jaw, turning of the respective screw in one direction causing the jaw to move inwardly of the standard into the groove in the fifth wheel pin and turning of the screw in the opposite direction causing the jaw to move outwardly of the standard and out of the groove in the pin.

References Cited in the file of this patent

UNITED STATES PATENTS

| | | |
|---|---|---|
| 1,202,912 | Souther | Oct. 31, 1916 |
| 1,237,154 | Baus | Aug. 14, 1917 |
| 1,869,054 | Evans | July 26, 1932 |
| 1,892,589 | Snyder | Dec. 27, 1932 |
| 2,036,344 | Menhall | Apr. 7, 1936 |
| 2,099,288 | Allen | Nov. 16, 1937 |